3,511,441
EJECTOR WITH VARIABLE INNER FLAP
Thomas F. Tumicki, Yantic, Conn., assignor to United Aircraft Corporation, East Hartford, Conn., a corporation of Delaware
Filed Oct. 1, 1964, Ser. No. 400,778
Int. Cl. B64c *15/04*
U.S. Cl. 239—265.29      5 Claims This invention relates to variable area exhaust nozzles and more particularly to variable area exhaust nozzles of the ejector type intended for use with vehicles which operate at high Mach number speeds.

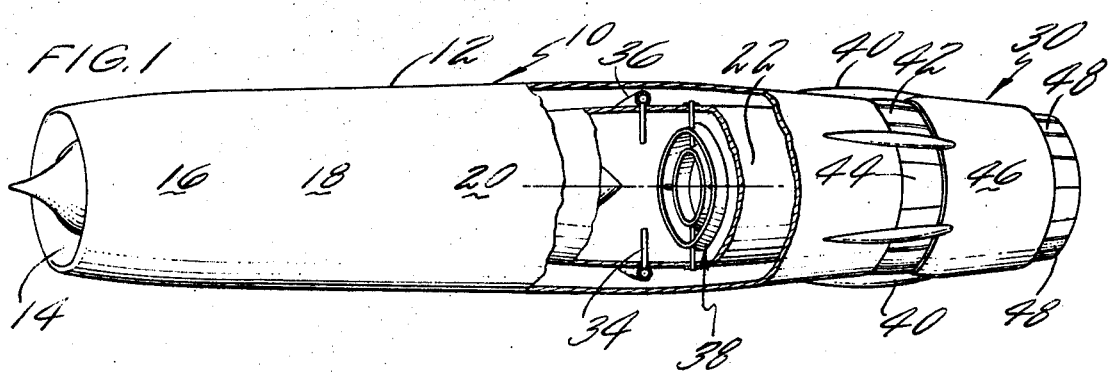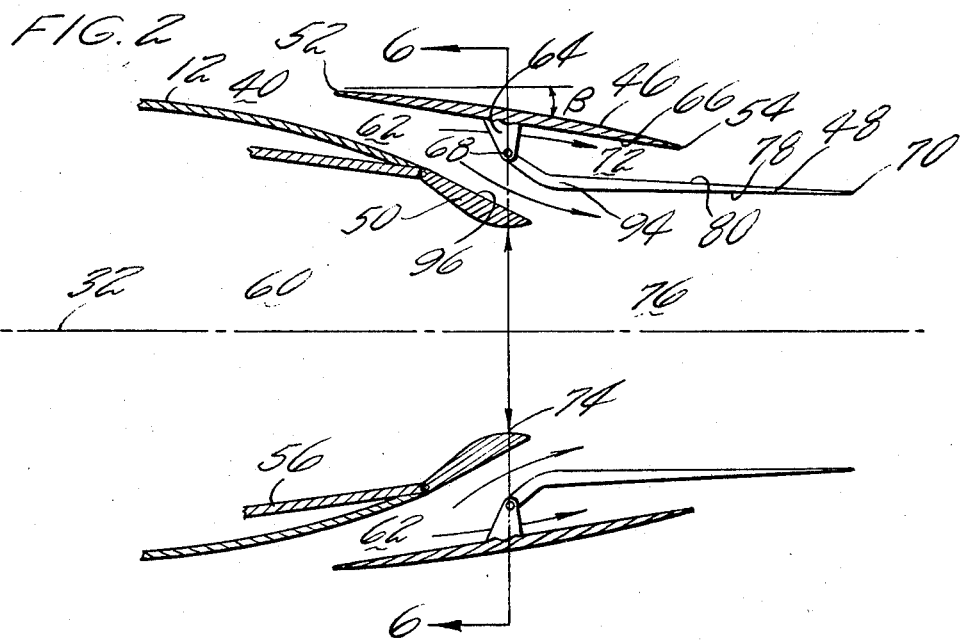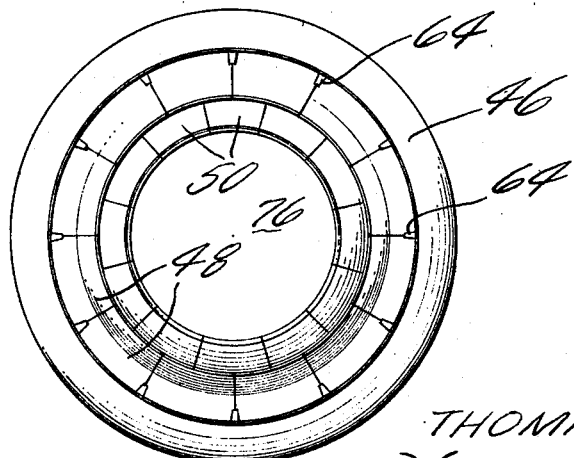

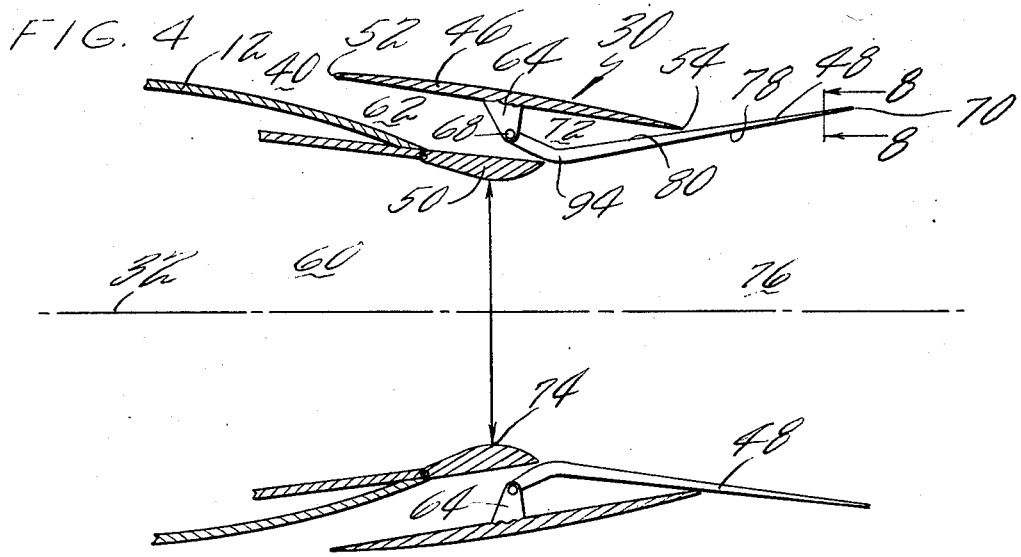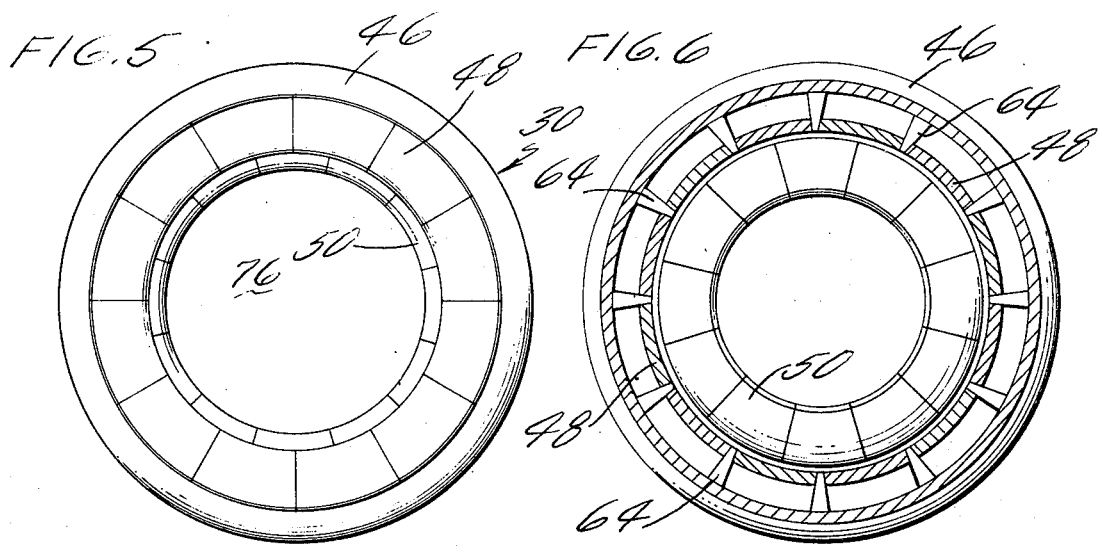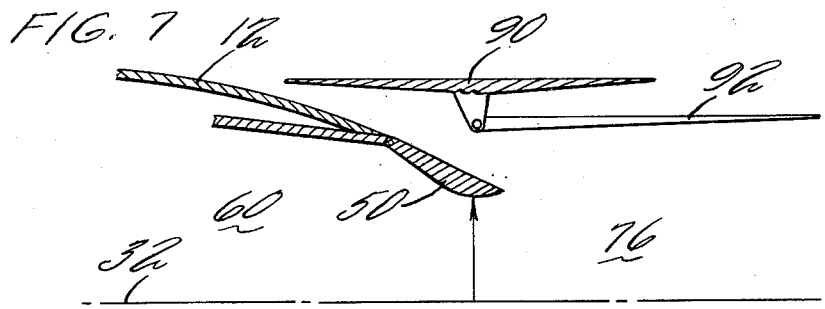
INVENTOR
THOMAS F. TUMICKI
BY Vernon F. Hauschild
ATTORNEY United States Patent Office
3,511,441
Patented May 12, 1970

In the conventional type of ejector exhaust nozzle, as best shown in U.S. Pat. Nos. 3,057,150 and 3,062,003, a plurality of circumferentially positioned boat-tail flaps are pivotally attached to the after end of a fixed shroud. These flaps pivot to an inner position during subsonic operation and form a drag creating pocket between the inner surface of the fixed shroud and the inner surface of the flaps. My invention overcomes the creation of this drag creating pocket. During supersonic operation, the flaps of the conventional ejector type nozzle pivot to an outer position wherein their inner surfaces form a continuation of the divergent inner surface of the shroud. In the conventional construction, the nozzle area ratio, that is the ratio between the nozzle exit area and the nozzle throat area is limited for a nozzle of a particular length. In my invention, the nozzle area ratio can be greater than in the conventional nozzle for a given nozzle length because my inner flaps are capable of assuming a position of greater divergence than in the conventional nozzle.

It is an object of this invention to teach a variable area exhaust nozzle of the ejector type which is convergent for low speed operation and which is convergent-divergent for high speed operation.

It is a further object of this invention to teach an ejector type exhaust nozzle using a thin fixed shroud carrying a plurality of inner flaps suspended from the inner surface thereof so that the flaps form a gas flow passage with the fixed shroud during low speed or subsonic operation thereby preventing the creation of drag creating pressure voids therebetween and further so that the flaps present a continuous, smooth, divergent expansion surface downstream of a primary exhaust nozzle during high speed, supersonic operation.

It is still a further object of this invention to teach an ejector type exhaust nozzle having an annular fixed shroud of thin lateral dimension and a shallow boat-tail angle and including suspension means to suspend a plurality of circumferentially positioned flaps radially inwardly thereof so that said flaps are aerodynamically actuated to form a gas passage with said shroud at subsonic speeds and to form a divergent, continuous expansion surface downstream of a primary exhaust nozzle during supersonic operation, thereby producing an exhaust nozzle having maximum nozzle area ratio for a given nozzle length.

It is a further object of this invention to teach an ejector type exhaust system using a fixed outer shroud and a plurality of inner flaps surrounding a variable area primary exhaust nozzle wherein said flaps are bent or bowed so as to form a gas passage of reduced areas surrounding the primary exhaust nozzle.

Other objects and advantages will be apparent from the specification and claims and from the accompanying drawings which illustrate an embodiment of the invention.

FIG. 1 is a side view, partially broken away, of a supersonic vehicle using my exhaust nozzle.

FIG. 2 is a cross-sectional view of my exhaust nozzle in its low speed or subsonic position.

FIG. 3 is a rear view of my exhaust nozzle in its low speed or subsonic position.

FIG. 4 is a cross-sectional view of my exhaust nozzle in its high speed or supersonic position.

FIG. 5 is a rear view of my exhaust nozzle in its high speed or its supersonic position.

FIG. 6 is a view taken along line 6—6 of FIG. 2, with the primary exhaust nozzle removed.

FIG. 7 shows a modification of my exhaust nozzle shown in cross section.

FIG. 8 is a view taken along line 8—8 of FIG. 4.

Referring to FIG. 1 we see a high speed vehicle or power plant which may power a high speed vehicle to speeds of several Mach numbers. To illustrate my invention in an appropriate embodiment, but not in its only embodiment since it could be used with any thrust generating powerplant, FIG. 1 illustrates a conventional turbojet engine. Power plant 10 is enveloped within nacelle 12 and includes air inlet section 14, compressor section 16, burner section 18, turbine section 20, and may include afterburner section 22 and also includes my exhaust nozzle 30. Engine 10 is preferably of circular cross section and concentric about axis 32.

In the operation of engine 10, air enters air inlet 14, is compressed in passing through compressor section 16, has heat and energy added thereto in passing through burner section 18 and has sufficient energy extracted therefrom in passing through turbine section 20 to drive compressor section 16. After leaving turbine section 20, the exhaust gas will pass into afterburner 22. In afterburner 22, additional heat is added to the exhaust gases by the burning of fuel therein. Fuel is admitted into afterburner 22 through spray bars 34, which receive fuel from fuel manifold 36. Flameholder 38 is positioned downstream of the spray bars 34 to establish a combustion zone downstream thereof to support combustion within afterburner 22. After leaving afterburner 22, the exhaust gases are then discharged to atmosphere through my exhaust nozzle 30, which is supported from nacelle 12 by struts 40. Atmospheric air may enter into my exhaust nozzle 30 through ejector passage 42 which may or may not include blow-in doors 44. In FIG. 1, the visible parts of my exhaust nozzle include fixed member or shroud 46 and flaps 48.

Compressor 16, burner 18 and turbine 22 are of conventional design and may be of the type shown in greater particularity in U.S. Pat. Nos. 2,711,631 and 2,747,367. Afterburner 22 may also be of conventional design and may be of the type shown in greater particularity in U.S. Pat. Nos. 2,846,841 or 2,846,842.

My exhaust nozzle 30 is shown in greater particularity in FIGS. 2 through 6. Referring to FIG. 2 we are my exhaust nozzle 30 in cross section in its subsonic, convergent or low speed position. Nozzle 30 is concentric about axis 32 in all nozzle positions. As shown in FIG. 2, nozzle 30 includes annular fixed body or shroud 46, which is positioned, as best shown in FIG. 1, by struts 40 from nacelle 12. Shroud 46 is of thin radial dimension in the order of about three percent of the shroud outer diameter and creates low drag at all conditions of operation in view of its shallow boat-tail angle β which is preferably less than five degrees. Shroud 46 envelopes primary exhaust nozzle 50 and at least a portion of flaps 48. The leading edge 52 of shroud 46 is positioned forward of primary exhaust nozzle 50 while the trailing edge 54 of shroud 46 is positioned rearwardly or aft or downstream of primary exhaust nozzle 50. Engine exhaust duct 56 and primary exhaust nozzle 50 cooperate to define primary exhaust gas passage 60, while shroud 46 and nacelle 12 and primary exhaust nozzle 50 cooperate to define annular air or gas passage 62 therebetween. Primary nozzle 50 is of the conventional variable area flap type and may be of the type more particularly shown in U.S. Pat. No. 2,974,480.

A plurality of circumferentially positioned lugs 64 project radially inwardly from the inner surface 66 of shroud 46. While not necessarily so limited, in my preferred embodiment, lugs 64 are approximately at the midpoint axially between leading edge 52 and trailing edge 54 of shroud 46. Flaps 48, which are circumferentially positioned and overlapping in sealing relation as best shown in FIG. 8 include forward end 68, which is pivotally attached by conventional means such as pins to lug 64 and after end 70, which defines the nozzle exit area, while the primary exhaust nozzle 50 defines the throat area of my exhaust nozzle 30.

As best shown in FIG. 2, the flaps of primary exhaust nozzle 50 and inner flaps 48 of my exhaust nozzle 30 are pivotable to an inner position during subsonic operation in which flaps 48, which overlap to form a continuous variable area duct, cooperate with shroud 46 to form annular air passage 72 therebetween. Accordingly, during subsonic or low exhaust nozzle pressure ratio operation, the engine exhaust gas passes through primary exhaust duct 60, then through throat 74 of the primary exhaust nozzle 50, and then through passage 76 defined by inner flaps 48. The forward motion of nozzle 30 causes atmospheric air to enter through annular passage 62 and both to fill the void which would normally be created at the outer periphery of passage 76 by flowing against the inner surface 78 of flaps 48 and also by flowing through annular air passage 72 where it passes against the inner surface 66 of shroud 46 having outer surface 80 of flaps 48. The passage of this atmospheric air through passage 72 prevents the creation of drag establishing pockets therein and thereby increases the performance of the exhaust nozzle 30. Nozzle 30 is a convergent exhaust nozzle when in its FIGS. 2 and 3 position.

During supersonic operation, the flaps of primary nozzle 50 and inner flaps 48 are pivotable to their outer positions as best shown in FIGS. 4 and 5. While in FIGS. 2 and 3, my exhaust nozzle 30 is a convergent exhaust nozzle, in FIGS. 4 and 5 it is a convergent-divergent exhaust nozzle. In the FIGS. 4 and 5 position, the engine exhaust gases from passage 60 pass through throat 74 of primary exhaust nozzle 50 and then expand against the continuous, smooth, divergent expansion surface formed by the inner surface 78 of flaps 48. In the supersonic FIGS. 4 and 5 positions, due to the pressure of the exhaust gases in passages 60 and 76, there is probably no inlet flow through passage 62, in fact, if blow-in doors 44 were used, they would be blown to their closed position to block off flow through passage 62 in the FIGS. 4 and 5 position. It will be noticed that outer surface 80 of flaps 48 abut against the trailing edge 54 of shroud 46. It will further be noted that since flaps 48 can project outwardly beyond shroud 46 in their supersonic FIGS. 4 and 5 position, the nozzle area ratio, that is the nozzle area at outlet 70 divided by the nozzle area at throat 74 is greater for a given nozzle length than could be the case in conventional ejector type exhaust nozzle in which the boat-tail flaps are pivotally attached to the after end of shroud 46.

Primary nozzle 50 is actuated by conventional means and flaps 48 are aerodynamically positioned by the combined forces of engine exhaust gas and ambient air acting thereagainst.

A modification of my exhaust nozzle 30 is shown in FIG. 7. In this modification the shroud 90 is cylindrical in construction and flaps 92 are straight axially. The flaps shown in the FIG. 7 construction differ from those shown in FIGS. 2 through 6 because in the former, flaps 48 include radially inwardly and rearwardly projecting hump 94, which is specifically contoured to cause the air flowing to passage 62 in the subsonic FIGS. 2 and 3 position to scrub against the outer surface 96 of primary nozzle 50 for nozzle cooling purposes.

As best shown in FIG. 8, flaps 48 include interflap seals 98 at their circumferential periphery and these interflap seals 98 may be of conventional design such as a thin circumferential extension of flap 48.

I claim:

1. In an ejector type exhaust nozzle for a high speed vehicle, an engine exhaust duct system, a variable area primary exhaust nozzle attached to the after end of said exhaust duct system and cooperating therewith to define a first gas passage, a fixed shroud having a forward and an after edge and enveloping said system and said nozzle to define a second gas passage therebetween, a plurality of flaps having forward and after edges and being positioned between said shroud and said nozzle, and suspension means attached to said shroud approximately midway between said forward and after edges thereof and pivotally suspending said flap forward edges laterally between said shroud and said nozzle so that said flaps are pivotable between an inner position wherein said flap and said shroud form a third gas passage therebetween and an outer position wherein said flaps contact said shroud after edge and present a smooth, divergent expansion surface rearward of said nozzle.

2. Apparatus according to claim 1 wherein said exhaust duct system, said primary exhaust nozzle, said shroud and said first gas passage are of circular cross section and concentric about an axis and further wherein said second and third gas passages are annular and concentric about said axis and still further wherein said flaps are circumferentially positioned and interconnected about said axis to form a variable area duct of circular cross section and concentric about said axis.

3. Apparatus according to claim 1 wherein said flaps are aerodynamically actuated.

4. An ejector type exhaust nozzle of circular cross section and concentric about an axis comprising a variable area primary exhaust nozzle, a fixed annular shroud having a forward and an after edge and being of thin radial dimension and extending axially to form an angle of about five degrees with said axis and enveloping said primary nozzle to define a first annular gas passage therewith, a plurality of circumferentially positioned lugs positioned between said shroud edges and projecting radially inwardly thereof, and a plurality of circumferentially positioned flaps positioned between said primary nozzle and said shroud and pivotally connected at their forward ends to said lugs to form a variable area duct positionable between an inner position wherein said variable area duct and said shroud form a second annular gas passage therebetween and an outer position wherein said variable area duct forms a smooth, divergent expansion surface rearward of said primary exhaust nozzle.

5. In an ejector type exhaust nozzle, a primary exhaust nozzle defining a first gas passage, a fixed shroud having a forward and a rearward end and positioned outwardly of said primary exhaust nozzle and cooperating therewith to define a second gas passage, a plurality of flaps positioned laterally between said shroud and said primary exhaust nozzle and extending rearwardly from said primary exhaust nozzle, means between said forward and rearward ends of said shroud to pivotally suspend said flaps from said shroud so that said flaps may be pivoted to an inner position wherein a third gas passage is formed between said shroud and said flaps and an outer position wherein said flaps present a smooth expansion surface downstream of said primary exhaust nozzle, and wherein said shroud is thin in lateral dimension and forms a boat-tail angle of about 5 degrees.

References Cited

UNITED STATES PATENTS 3,214,905  11/1965  Beavers et al. _____ 60—35.6

SAMUEL FEINBERG, Primary Examiner

U.S. Cl. X.R.

239—265.39